H. SORENSEN.
TRAFFIC SIGNAL.
APPLICATION FILED SEPT. 7, 1920.

1,368,064.

Patented Feb. 8, 1921.
2 SHEETS—SHEET 1.

Witnesses:
F. L. Fox,

Inventor
Holger Sorensen

By Victor J. Evans.
Attorney

H. SORENSEN.
TRAFFIC SIGNAL.
APPLICATION FILED SEPT. 7, 1920.

1,368,064.

Patented Feb. 8, 1921.
2 SHEETS—SHEET 2.

Holger Sorensen
INVENTOR

BY Victor J. Evans.
ATTORNEY

WITNESSES:
F. L. Fox.

UNITED STATES PATENT OFFICE.

HOLGER SORENSEN, OF MARNE, IOWA.

TRAFFIC-SIGNAL.

1,368,064.   Specification of Letters Patent.   Patented Feb. 8, 1921.

Application filed September 7, 1920. Serial No. 408,426.

*To all whom it may concern:*

Be it known that I, HOLGER SORENSEN, a citizen of the United States, residing at Marne, in the county of Cass and State of Iowa, have invented new and useful Improvements in Traffic-Signals, of which the following is a specification.

This invention has reference to direction indicators for automobiles and similar vehicles.

The primary object is the provision in a device of this character for indicating in an easy, quick and efficient manner the course the vehicle is to take, so that the vehicles or pedestrians both in the front and to the rear of the vehicle will have knowledge of the vehicle's course.

A further object is the provision of manually operated means for indicating the path of travel of an automobile or similar vehicle which may be readily installed on a vehicle, which may be cheaply manufactured, which is of simple construction and which is thoroughly efficient in operation.

The foregoing, and other objects which will appear as the nature of the invention is better understood may be accomplished by a construction, combination and operative arrangement of parts such as is disclosed by the accompanying drawings.

Figure 1:
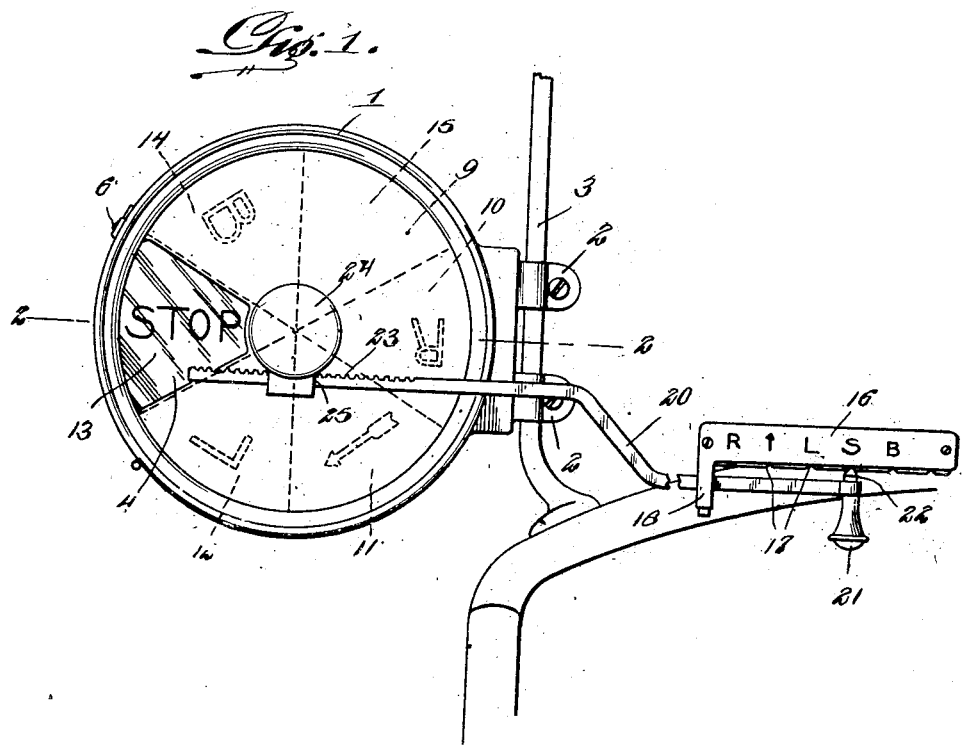
Figure 1 is a view in elevation illustrating the application of the improvement on a vehicle.
Figure 2:
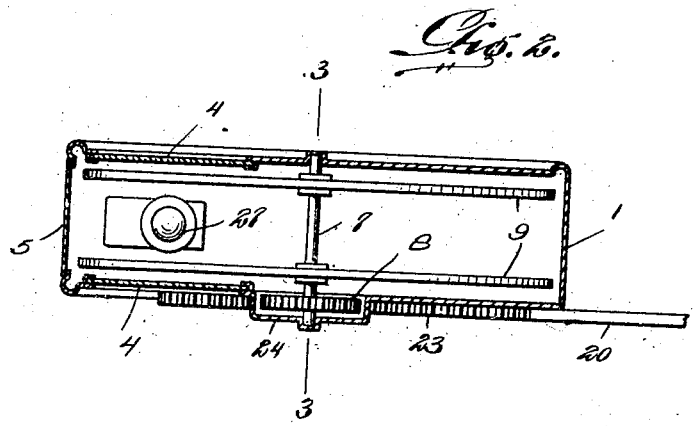
Fig. 2 is an enlarged sectional view approximately on the line 2—2 of Fig. 1.
Figure 3:
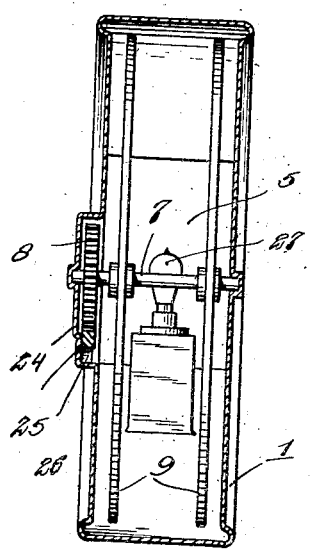
Fig. 3 is a similar section on the line 3—3 of Fig. 2.
Figure 4:
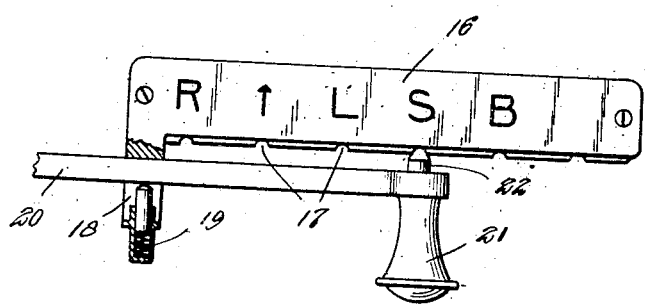
Fig. 4 is an elevation, partly in section, illustrating the manner in which the signals are brought to signaling position and locked in such position.
Figure 5:
Fig. 5 is a detail.

In the drawings I have illustrated my improved traffic signal secured to one of the sides of the wind shield of an automobile, but it is, of course, to be understood that the same may be attached to other convenient parts of the machine.

As disclosed by the drawings I employ a cylindrical casing 1 which has, on its inner edge brackets 2 that are attached to a support 3, such as the side of a wind shield, as disclosed by the drawings. The bracket members may, however be connected at their outer ends, and the end strip may be secured to the support.

The opposed faces of the casing 1 have quadrangular openings therein from the outer edge thereof, and these openings are closed by transparent plates 4. The openings closed by the said plates, while referred to as quadrangular are in reality of a size approximately equaling one-sixth of the diameter of the casing, and the said casing has on its outer edge an opening which is closed by a hinged door 5 and the said door is normally latched by means 6.

Journaled in suitable bearings transversely of the casing and centrally thereof is a shaft 7. This shaft extends one side of the casing, and on the said extension there is secured a cog wheel 8.

On the shaft 7, adjacent to the inner sides of the casing there is secured the signal disks 9—9. These disks on the outer faces thereof, are divided into a series of sections 10, 11, 12, 13, 14 and 15. Radially arranged lines divide the sections, and if desired the said sections may be differently colored. Preferably the disks 9 are constructed of glass, and the section 15 thereof is not colored so that the same is transparent. In the section 10 there is imprinted the letter R, indicating that the vehicle is to travel to the right. In the section 11 there is an arrow, indicating that the vehicle is to travel straight ahead. In the section 12 there is imprinted the letter L, indicating that the vehicle is to travel to the left. In the section 13 the word "Stop" is imprinted, while in the section 14 the word "Back" is imprinted. These last mentioned signals of course are to indicate that the vehicle is to be brought to a stop or is to be moved in a rearward direction, when the said signals are brought opposite the sight openings in the casing.

On the front or dash of the vehicle there is secured a bracket 16. This bracket has imprinted thereon all of the characters of the signal disks and has its under face, in alinement with each of the characters formed with an indenture 17. The bracket 16 has at one end a slotted arm 18, and in the slot of the said arm there is a spring 19. Through the slotted arms passes the operating rod 20. This rod has at its inner end a handle 21 disposed opposite a detent 22. The spring 19 exerts a tension against the rod to force the detent thereof into any of the indentures 17. The rod has a rack surface 23 to engage with the rack or cog wheel 8. The cog wheel is concealed in a casing 24 on one of the sides of the casing 1, and the said casing or housing 24 has slots or openings 25 therethrough for the reception of the operating rod 20. In the housing 24 there is a spring 26 that bears on the upper and straight edge of the operating rod 20 to force the rack surface thereof in engagement with the toothed wheel 8.

The indicating characters on the plate or bracket 16 are so arranged with respect to the indicating characters on the disk signals, that when the operating rod is actuated, say to bring the transparent portion of the signals in alinement with the transparent sight opening of the casing, the detent 22 will be received in the detent opposite the character on the plate 16 which indicates the transparent signal plates are opposite the sight openings, and in a like manner the detent of the operating rod will be brought in the indenture opposite the remaining characters on the plate when the other signals of the disks are brought opposite the sight openings in the casing.

The plain surfaces of the signal disks are in register with the sight openings when the vehicle is at a stand still, and in the casing between the disks there is a bulb 27 that is connected to the electric circuit of the machine so that the signal will be visible at night.

Having thus described the invention, what I claim, is:—

A direction indicator for automobiles or the like, including a cylindrical casing having sight openings on the opposed faces thereof and a door therebetween, a shaft journaled transversely through the casing, transparent disks on the shaft having warning signals imprinted thereon, a light emitting element between the disks in the casing, a toothed wheel on the shaft, a rack bar engaging the wheel, spring means for influencing the rack bar to bring the teeth thereof in engagement with the teeth of the wheel, a bracket, a guide thereon for the rack bar, spring means for influencing the rack bar in the direction of the bracket, a lug on the bracket, said brackets having spaced depressions to receive the lug therein, and the said bracket having indicia thereon arranged opposite the depressions which correspond with the warning signals on the disk.

In testimony whereof I affix my signature.

HOLGER SORENSEN.